UNITED STATES PATENT OFFICE 2,326,006

SYNTHETIC RESIN FROM POLYACETOACETATES OF POLYHYDRIC ALCOHOLS AND FORMALDEHYDE

Herman A. Bruson, Philadelphia, Pa., assignor to The Resinous Products & Chemical Company, Philadelphia, Pa., a corporation of Delaware No Drawing. Application July 30, 1940, Serial No. 348,441

5 Claims. (Cl. 260—64)

This invention relates to synthetic resins. In particular it deals with resinous compositions obtained by condensing formaldehyde with an ester of a polyhydric alcohol and acetoacetic acid.

It is already known that formaldehyde yields thin to viscous liquids when condensed with esters of monohydric alcohols and acetoacetic acid, such as methyl acetoacetate or ethyl acetoacetate. Products of this type have not thus far proved to be commercially valuable.

We have now found, however, that polyhydric alcohol esters of acetoacetic acid react with formaldehyde to give new and useful resins which are very light in color and which vary from tough to hard and soluble to insoluble.

To produce these resins formaldehyde is condensed with a polyhydric alcohol ester of acetoacetic acid under neutral, acidic or alkaline conditions. If desired, the reaction may be performed in the presence of a solvent such as an alcohol, ester, or dioxane. It is desirable to use at least one mol of formaldehyde for each acetoacetate group. The formaldehyde in the form of a solution in water or organic solvent or in the form of a solid polymer is mixed with the ester. The mixture is then stirred and maintained between 0° C. and 100° C. until the desired stage of condensation or resinification is reached. The time required for the reaction varies inversely as the temperature, lower temperatures requiring longer times while higher temperatures accelerate the reaction. As higher temperatures tend to give more color than lower, it is preferred to effect the reaction at as low a temperature as is convenient and practical.

The esters which are useful in this invention contain at least two acetoacetic acid groups in each molecule, chemically combined with a polyhydric alcohol group. Typical alcohols include ethylene glycol, propane-1,2-diol, trimethylene glycol, butylene glycol, or other alkylene glycol, diethylene glycol, triethylene glycol, glycerol, polyglycerol, phenyl glycols, sorbitol, mannitol, pentaerythritol, etc. The esters of the polyhydric alcohols are obtainable by reaction of polyhydric alcohol with diketene or dimer of ketene by methods already known.

The condensates and resins of this invention exhibit thermoplasticity in varying degrees. They may be combined with other resinous materials and the compositions thus obtained mixed with pigments, fillers, dyes, suitable solvents, driers, etc. as required. The new resins are particularly useful in cellulose ester lacquers.

The following examples illustrate the invention. The parts shown are by weight.

Example 1

A mixture of 46 parts of glycol diacetoacetate and 40 parts of 30% formaldehyde solution was rapidly stirred for about 24 hours at room temperature. A viscous colorless syrup separated from the water, which was removed. The viscous liquid was washed several times with warm water and dried at 110–130° C. under reduced pressure. A colorless, rubbery resin remained, which was not appreciably soluble in methanol, ethanol, butanol, or toluene, but dissolved readily in acetone, ethyl acetate, dioxane, and glycol monoethyl ether. It was found useful as an ingredient in nitrocellulose lacquers.

Example 2

A mixture of 52 parts of glycerol diacetoacetate and 40 parts of 30% formaldehyde solution was stirred at 30° C. The reaction mixture became warm and in a short time a rubbery mass separated. The aqueous layer was drawn off and the resinous material washed and dried in an oven to yield an insoluble resin.

I claim:

1. The process of preparing resinous compositions which comprises condensing formaldehyde and an ester of a polyhydric alcohol and acetoacetic acid, said ester containing at least two acetoacetate groups.

2. The process of preparing resinous compositions which comprises condensing formaldehyde and glycol diacetoacetate.

3. The process of preparing resinous compositions which comprises reacting between 0° C. and 100° C. at least two mols of formaldehyde with one mol of an ester of a polyhydric alcohol and acetoacetic acid, said ester having at least two acetoacetate groups.

4. A resinous condensation product of formaldehyde and an ester of a polyhydric alcohol and acetoacetic acid, said ester having at least two acetoacetate groups.

5. A resinous condensation product of formaldehyde and glycol diacetoacetate.

HERMAN A. BRUSON.